United States Patent
Zhou et al.

(10) Patent No.: US 10,523,718 B2
(45) Date of Patent: Dec. 31, 2019

(54) VIDEO PLAYING METHOD AND DEVICE

(71) Applicant: GUANGZHOU UCWEB COMPUTER TECHNOLOGY CO., LTD., Guangzhou, Guangdong (CN)

(72) Inventors: Wenjing Zhou, Guangzhou (CN); Chun Liu, Guangzhou (CN)

(73) Assignee: Guangzhou UCWeb Computer Technology Co., Ltd., Guangzhou, Guangdong (CN)

(*) Notice: Subject to any disclaimer, the term of this patent is extended or adjusted under 35 U.S.C. 154(b) by 292 days.

(21) Appl. No.: 15/505,871

(22) PCT Filed: Apr. 13, 2016

(86) PCT No.: PCT/CN2016/079184
§ 371 (c)(1),
(2) Date: Feb. 22, 2017

(87) PCT Pub. No.: WO2016/169426
PCT Pub. Date: Oct. 27, 2016

(65) Prior Publication Data
US 2017/0289204 A1    Oct. 5, 2017

(30) Foreign Application Priority Data
Apr. 21, 2015    (CN) .......................... 2015 1 0191293

(51) Int. Cl.
*G06F 15/16*    (2006.01)
*H04L 29/06*    (2006.01)
(Continued)

(52) U.S. Cl.
CPC .......... *H04L 65/1069* (2013.01); *H04L 29/08* (2013.01); *H04L 65/60* (2013.01);
(Continued)

(58) Field of Classification Search
CPC ................................................ H04N 21/41407
(Continued)

(56) References Cited

U.S. PATENT DOCUMENTS 8,103,740 B1 * 1/2012 Abramov ............ G06F 9/44521
709/217
9,189,466 B2 * 11/2015 Mikles .................... G06F 9/546
(Continued)

FOREIGN PATENT DOCUMENTS

| CN | 102047286 A | 5/2011 |
| CN | 102779046 A | 11/2012 |

(Continued)

OTHER PUBLICATIONS

HTML5 Mediaby Shelley PowersPublisher: O'Reilly Media, Inc. Release Date: Aug. 2011 https://www.oreilly.com/library/view/html5-media/9781449308063/#toc-start (Year: 2011).*
(Continued)

*Primary Examiner* — Hamza N Algibhah
(74) *Attorney, Agent, or Firm* — Sheppard Mullin Richter & Hampton LLP

(57) ABSTRACT

The present application provides a video playing method and apparatus. The method includes: establishing a video message communication channel between a webpage main document including a webpage iframe and the webpage iframe; searching, by the webpage iframe, for a video marker included in the webpage iframe and acquiring video information according to the video marker; and receiving, by the webpage main document, the video information returned by the webpage iframe by using the communication channel, and performing video playing according to the video information. By means of the present application, a player built in a current browser can be called to perform
(Continued)

playing during video playing, to improve user experience in playing of cross-domain video services.

15 Claims, 3 Drawing Sheets

(51) Int. Cl.
    *H04L 29/08*     (2006.01)
    *H04N 21/234*     (2011.01)
    *H04N 21/24*     (2011.01)
    *H04N 21/414*     (2011.01)
    *H04N 21/432*     (2011.01)
    *H04N 21/4782*     (2011.01)

(52) U.S. Cl.
    CPC ............ *H04L 65/607* (2013.01); *H04L 67/02* (2013.01); *H04N 21/234* (2013.01); *H04N 21/2402* (2013.01); *H04N 21/41407* (2013.01); *H04N 21/4325* (2013.01); *H04N 21/4782* (2013.01)

(58) Field of Classification Search
    USPC .......................................................... 709/224
    See application file for complete search history.

(56) References Cited

U.S. PATENT DOCUMENTS

| | | | | |
|---|---|---|---|---|
| 9,697,188 | B2* | 7/2017 | Kolam | G06F 17/2247 |
| 9,703,575 | B2* | 7/2017 | Fu | G06F 9/4843 |
| 2004/0021684 | A1 | 2/2004 | Millner | |
| 2007/0299857 | A1 | 12/2007 | Gwozdz et al. | |
| 2007/0300064 | A1* | 12/2007 | Isaacs | G06F 16/957 |
| | | | | 713/168 |
| 2009/0299862 | A1 | 12/2009 | Fan et al. | |
| 2009/0328063 | A1* | 12/2009 | Corvera | G06F 9/54 |
| | | | | 719/315 |
| 2011/0113354 | A1* | 5/2011 | Thiyagarajan | G09G 5/14 |
| | | | | 715/760 |
| 2011/0141280 | A1* | 6/2011 | Cao | H04N 21/643 |
| | | | | 348/143 |
| 2012/0084641 | A1* | 4/2012 | Chung | G06Q 30/0241 |
| | | | | 715/240 |
| 2012/0185784 | A1* | 7/2012 | Katz | G06F 16/954 |
| | | | | 715/760 |
| 2012/0254925 | A1 | 10/2012 | Nassiri | |
| 2013/0167005 | A1 | 6/2013 | Corbett et al. | |
| 2014/0189049 | A1* | 7/2014 | Volchok | H04L 67/2823 |
| | | | | 709/217 |
| 2014/0229271 | A1* | 8/2014 | Clapp | G06Q 30/0245 |
| | | | | 705/14.44 |
| 2014/0229821 | A1* | 8/2014 | Abrahami | G06F 17/2247 |
| | | | | 715/235 |
| 2014/0245134 | A1* | 8/2014 | Portnoy | G06F 9/451 |
| | | | | 715/240 |
| 2014/0317638 | A1* | 10/2014 | Hayes | G11B 27/005 |
| | | | | 719/318 |
| 2014/0344880 | A1 | 11/2014 | Geller et al. | |
| 2015/0200976 | A1* | 7/2015 | Goldfeder | H04L 65/403 |
| | | | | 709/204 |
| 2015/0312308 | A1 | 10/2015 | Wang et al. | |
| 2017/0139722 | A1* | 5/2017 | Fu | G06F 9/4843 |

FOREIGN PATENT DOCUMENTS

| | | |
|---|---|---|
| CN | 102904962 A | 1/2013 |
| CN | 103023790 A | 4/2013 |
| CN | 103246667 A | 8/2013 |
| CN | 103856543 A | 6/2014 |
| CN | 104090820 A | 10/2014 |
| RU | 2516476 C2 | 5/2014 |

OTHER PUBLICATIONS

International Search Report and Written Opinion for Application No. PCT/CN2016/079184, dated Jun. 22, 2016, 9 pages.
PCT International Preliminary Report on Patentability dated Oct. 24, 2017, issued in International Application No. PCT/CN2016/079184 (8 pages).
Office Action dated Jul. 11, 2018, issued in Russian Application No. 2017114860 (13 pages, including corresponding English translation).
Search Report dated Jul. 10, 2018, issued in Russian Application No. 2017114860 (4 pages, including corresponding English translation).
Decision on Grant dated Dec. 11, 2018, issued in related Russian Application No. 2017114860 (20 pages).
First Search dated Aug. 14, 2018, issued in related Chinese Application No. 201510191293.0 (1 page).
First Office Action dated Aug. 22, 2018, issued in related Chinese Application No. 201510191293.0 (13 pages), with English machine translation.

* cited by examiner

VIDEO PLAYING METHOD AND DEVICE

CROSS-REFERENCE TO RELATED APPLICATIONS

This application is a national phase application of International Application No. PCT/CN2016/079184, filed on Apr. 13, 2016, which claims priority to and benefits of Chinese Patent Application No. 201510191293.0, filed on Apr. 21, 2015. The contents of the above-referenced applications are incorporated herein by reference in their entirety.

TECHNICAL FIELD

The present application relates to the field of video playing technologies, and specifically, to a video playing method and apparatus.

BACKGROUND

With the development of science and technologies, mobile terminals are more widely applied in people's daily life. One extremely important feature of a mobile terminal is: the mobile terminal can perform webpage browsing in a browser.

Currently, a method for browsing a webpage on a mobile terminal is generally: a user inputs a website in a browser, and the browser issues a page request to a server based on the website. The server returns an html file corresponding to the page request to the browser. The browser starts loading html code and acquires a CCS (Cascading Style Sheets, cascading style sheets) file from the server according to a link tag in a head of the html code. The browser continues loading html main body code and renders a page based on the CSS file. In a process of loading the html main body code, design performed according to a page architecture sometimes introduces a playing service of a cross-domain video. The cross-domain video refers to that an iframe (a webpage inline frame, which is a tag of HTML, and the element creates an iframe including another document) exists in a current webpage, and a to-be-played video exists in the iframe. If a domain name, a protocol, or a port of the iframe are different from those of the current webpage (usually domain names are different), a video in the iframe is a cross-domain video. For example, a webpage whose domain name is A includes an iframe whose domain name is B, and a video on the iframe may be referred to as a cross-domain video.

Currently, most browsers use webkit as a core. A browser uses a built-in player to play a video, and the player built in the browser refers to a calling to a player built in the system, which is packaged on a surface, transformed by using an UI (User Interface, user interface), into a self-defined player of the browser. Because the webkit core does not have rights for cross-domain access, the webkit core can only perform playing by calling a player built in the system when playing a cross-domain video. For example, a particular browser that is designed specific to an ios system (an ios system is a mobile operation system developed by the Apple Inc.) and that uses a webkit core can only perform playing by calling a player built in the ios system when playing a cross-domain video.

In a service of cross-domain playing of videos, a browser can only perform playing by calling a player built in a system and cannot perform playing by calling a player not built in the system. Therefore, user experience is relatively poor.

SUMMARY

An objective of the present application is to provide a video playing method and apparatus, to improve user experience in playing of cross-domain video services.

According to a first aspect, an embodiment of the present application provides a video playing method, including: establishing a video message communication channel between a webpage main document including a webpage iframe and the webpage iframe; searching, by the webpage iframe, for a video marker included in the webpage iframe and acquiring video information according to the video marker; and receiving, by the webpage main document, the video information returned by the webpage iframe by using the communication channel, and performing video playing according to the video information.

According to a second aspect, an embodiment of the present application further provides a video playing apparatus, including: a communication channel establishment module, configured to establish a video message communication channel between a webpage main document including a webpage iframe and the webpage iframe; a video information searching module, configured to enable the webpage iframe to search for a video marker included in the webpage iframe and acquire video information according to the video marker; a video information receiving module, configured to enable the webpage main document to receive the video information returned by the webpage iframe by using the communication channel; and a video playing module, configured to perform video playing according to the video information.

According to a third aspect, an embodiment of the present application provides a computing device, including: one or more processors; a memory; and one or more modules, stored in the memory and configured to be executed by the one or more processors, where the one or more modules are configured to: establish a video message communication channel between a webpage main document including a webpage iframe and the webpage iframe; search, by the webpage iframe, for a video marker included in the webpage iframe and acquire video information according to the video marker; and receive, by the webpage main document, the video information returned by the webpage iframe by using the communication channel, and perform video playing according to the video information.

According to a fourth aspect, an embodiment of the present application provides a computer readable storage medium on which a program for executing the method of the embodiments of the present application is recorded.

When a cross-domain video is played by using the video playing method of the present application, after a webpage main document and a webpage iframe establish a connection based on a message communication channel, the webpage iframe can search for a video marker included in the webpage iframe, acquire video information according to the found video marker, and send the acquired video information to a webpage main document, so as to call a player built in a current browser to perform playing during video playing, thereby improving user experience in a service of playing a cross-domain video.

To make the foregoing objective, features, and advantages of the present application more obvious and easily understood, detailed descriptions are made below by using preferred embodiments as examples and with reference to the attached accompanying drawings.

BRIEF DESCRIPTION OF THE DRAWINGS

To more clearly describe the technical solution in embodiments of the present application, accompanying drawings needed to be used in the embodiments are briefly described below. It should be understood that the following accompanying drawings are merely some embodiments of the present application and therefore are not regarded as limitation to the scope. A person skilled in the art can obtain other relevant drawings according to these accompanying drawings without involving any creative effort.

DETAILED DESCRIPTION

The following clearly and completely describes the technical solutions in the embodiments of the present application with reference to the accompanying drawings in the embodiments of the present application. Apparently, the described embodiments are some of the embodiments of the present application rather than all of the embodiments. Components of the embodiments of the present application described and shown in the accompanying drawings here may be arranged and designed in various different configurations. Therefore, the following detailed descriptions for the embodiments of the present application provided in the accompanying drawings are not intended to limit the claimed scope of the present application but merely indicate selected embodiments of the present application. All other embodiments obtained by a person skilled in the art based on the embodiments of the present application without creative efforts shall fall within the protection scope of the present application.

When a mobile terminal based on an ios system plays a cross-domain video in a browser, because the webkit core does not have rights for cross-domain access, the webkit core can only play a cross-domain video by calling a player built in the system but cannot play a cross-domain video by calling a player built in the browser.

To achieve an objective of playing a cross-domain video by using a player built in a browser, an embodiment of the present application provides a video playing method. The method can be applied to the ios system. When a cross-domain video presents in a webpage loaded by the browser of the mobile terminal, before webpage rendering, a connection is established between a webpage main document and a webpage iframe, and the iframe searches for video markers included in the iframe and acquires video information. The webpage main document records the video information acquired by the iframe, and can perform playing by calling a player built in the browser when playing a video.

Figure 1:
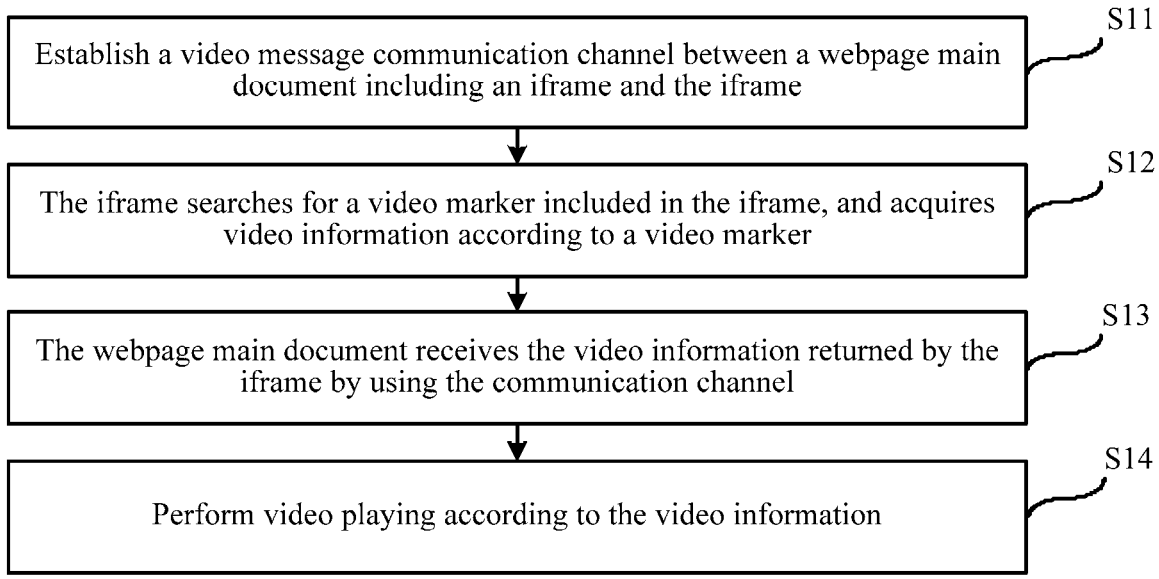
FIG. 1 is a first flowchart of a video playing method according to an embodiment of the present application.

Based on the foregoing idea, an embodiment of the present application provides a video playing method. The method can be applied to the ios system. In specific implementations, the method can be run on a mobile terminal (such as iphone/ipod/itouch/ipad and the like) in which a browser is installed. The browser installed on the mobile terminal uses a webkit core, and uses a player built in the browser to play a cross-domain video. As shown in FIG. 1, main processing steps of the method include:

Step S11: Establish a video message communication channel between a webpage main document including an iframe and the iframe.

A webpage loaded by the browser includes a webpage main frame, and may include an iframe. A cross-domain video only exists when a webpage includes an iframe. That is, when a domain name of the iframe is different from a domain name of the webpage, a video on the iframe may be referred to as a cross-domain video.

Currently, when a browser using webkit as a core plays a cross-domain video, the browser does not have rights for access to the iframe to acquire video information, and can only play a cross-domain video by calling a player built in the system.

In the present application, when a webpage includes a cross-domain iframe, and the iframe includes a video, a connection is established between the iframe and the webpage main document, so that the iframe and the webpage main document can transmit messages. That is, a message communication channel is established between the iframe and the webpage main document. The message communication channel is a virtual information channel and refers to that the iframe and the webpage main document can perform information interaction.

Step S12: The iframe searches for a video marker included in the iframe, and acquires video information according to the video marker.

When the iframe includes a video, the iframe searches for the video marker included in the iframe and acquires video information, such as a video address based on the found video marker.

In the present application, there are multiple trigger manners of searching, by the iframe, for a video marker included in the iframe. For example, when the iframe has video information, the iframe automatically searches for a video marker and sends to the webpage main document video information acquired according to the video marker. For another example, the iframe is triggered by a message from the webpage main document and for searching for a video marker, and the iframe searches for the video marker in response to the message of the webpage main document.

Manners for triggering the iframe to search for a video marker included in the iframe may be set according to actual needs and are not listed herein one by one.

Step S13: The webpage main document receives the video information returned by the iframe by using the communication channel.

After acquiring the video information according to the found video marker, the iframe sends the acquired video information to the webpage main document by using the communication channel between the iframe and the webpage main document, and the webpage main document receives and records the video information.

Step S14: Perform video playing according to the video information.

After acquiring the video information, the webpage main document can perform, by calling a player built in a current browser, playing according to the video information acquired by the webpage main document when a cross-domain video needs to be played.

In an application scenario of the present application, the webpage main document sends a message for searching for the video information to the iframe, and the iframe monitors the message sent by the webpage main document, searches for the video marker included in the iframe in response to the message, and acquires the video information according to the video marker.

Figure 2:
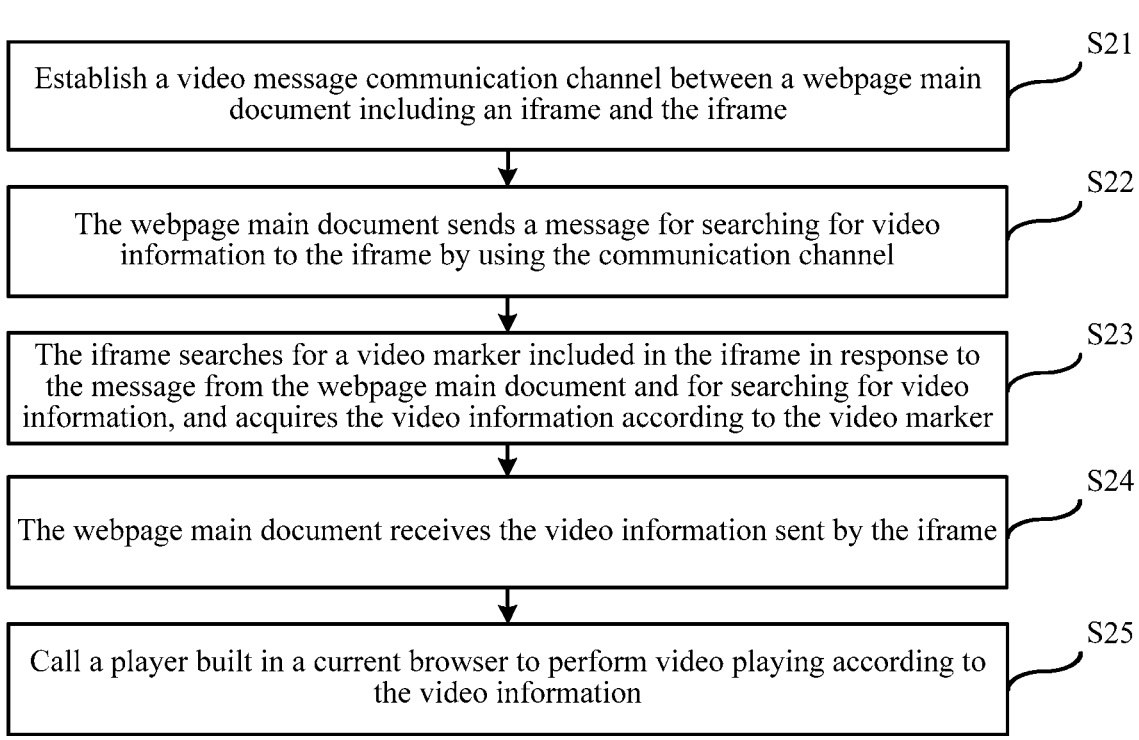
FIG. 2 is a second flowchart of a video playing method according to an embodiment of the present application.

In specific implementations, before webpage rendering, a network module of the mobile terminal injects a monitoring instruction into the iframe of the webpage. The network module is a bottom-layer module of the mobile terminal and is configured to monitor data received by a network layer, including original data of the webpage. The network module can inject a monitoring instruction into the iframe in the network layer. The iframe can monitor a message sent by the webpage main document by using the monitoring instruction. After the monitoring instruction in the iframe detects the message for searching for the video information, the iframe searches for a video marker included in the iframe, acquires the video information according to the video marker, and notifies the webpage main document of the acquired video information, so that the webpage main document acquires the video information, and thus performs playing by calling a player built in the browser when playing a video. By means of the foregoing solution, a technical problem that a cross-domain video cannot be played by calling a player built in a browser on an ios platform is resolved. FIG. 2 shows implementation steps of a video playing method in this application scenario, including:

Step S21: Establish a video message communication channel between a webpage main document including an iframe and the iframe.

Step S22: The webpage main document sends a message for searching for video information to the iframe by using the communication channel.

In specific implementations, an action of sending the message for searching for video information to the iframe may be triggered by loading a page main document of a webpage.

Step S23: The iframe searches for a video marker included in the iframe in response to the message from the webpage main document and for searching for video information, and acquires the video information according to the video marker.

A monitoring instruction is set in the iframe, to monitor the message sent by the webpage main document. After the iframe detects the message from the webpage main document and for searching for video information, the iframe searches for the video information by searching for the video marker.

Using Iphone (Iphone) as an example, a browser built in the cell phone is a safari browser. A user may install a browser not built in a system in the cell phone according to actual needs. When the user browses a webpage on the browser, a domain A webpage loaded on the browser includes a domain B iframe, and the domain B iframe includes a video, a webpage main document of the domain A webpage send a message for searching for video information to the domain B iframe. A monitoring instruction used to monitor the webpage main document is set in the domain B iframe. When the monitoring instruction detects the message from the webpage main document of the domain A webpage and for searching for video information, the domain B iframe searches for a video marker in the iframe in response to the message, and acquires the video information according to the found video marker.

In the present application, the message from the webpage main document to the iframe and for searching for video information is a message formed based on JS (JavaScript, interpreted scripting language). The monitoring instruction that is used to monitor the webpage main document and that is set in the iframe is also an instruction formed based on JS.

Preferably, before webpage rendering, a network module of the mobile terminal injects a monitoring instruction formed based on JS to the iframe, for the iframe to monitor the message from the webpage main document and for searching for video information.

Step S24: The webpage main document receives the video information sent by the iframe.

Considering real-time validity of acquiring, by the webpage main document, the video information sent by the iframe, an interaction instruction used to interact with the iframe may also be set on the webpage main document. The interaction instruction can monitor a notification message from the iframe, so as to acquire the video information from the notification message.

Therefore, in an optional embodiment of the present application, that the webpage main document receives the video information returned by the webpage iframe by using the communication channel may be specifically that the webpage main document monitors the notification message from the webpage iframe, and acquires the video information from the detected notification message. That is, the webpage main document monitors the notification message from the iframe by using the interaction instruction, and then acquires the video information from the detected notification message.

Still using Iphone as an example, after the domain B iframe in the browser acquires the video information in response to the message from the webpage main document of the domain A webpage and for searching for video information, the domain B iframe transfers the video information as notification content of the notification message to the webpage main document of the domain A webpage. After detecting the notification message sent by the iframe, the webpage main document of the domain A webpage acquires the video information from the notification message.

Step S25: Call a player built in a current browser to perform video playing according to the video information.

The webpage main document receives and stores the video information. When video playing is performed, the browser of the mobile terminal calls a built-in player thereof to perform playing according to the video information recorded in the webpage main document, so as to play a cross-domain video by using a player built in the browser and improve user experience in a service of playing a cross-domain video.

Using Iphone as an example, after receiving the video information provided by the domain B iframe, the webpage main document of the domain A webpage in the browser calls a built-in player thereof to play a cross-domain video.

When the browser in the mobile terminal loads a webpage, the browser uses the webpage main document provided by a server to render a webpage. The webpage main document includes an html file, a CSS file, and the like. In a process of webpage rendering, according to design of a webpage architecture, when a cross-domain video needs to be played in the webpage, the webpage main document acquires the video information from a cross-domain iframe and calls a player built in the browser to perform playing.

Figure 3:
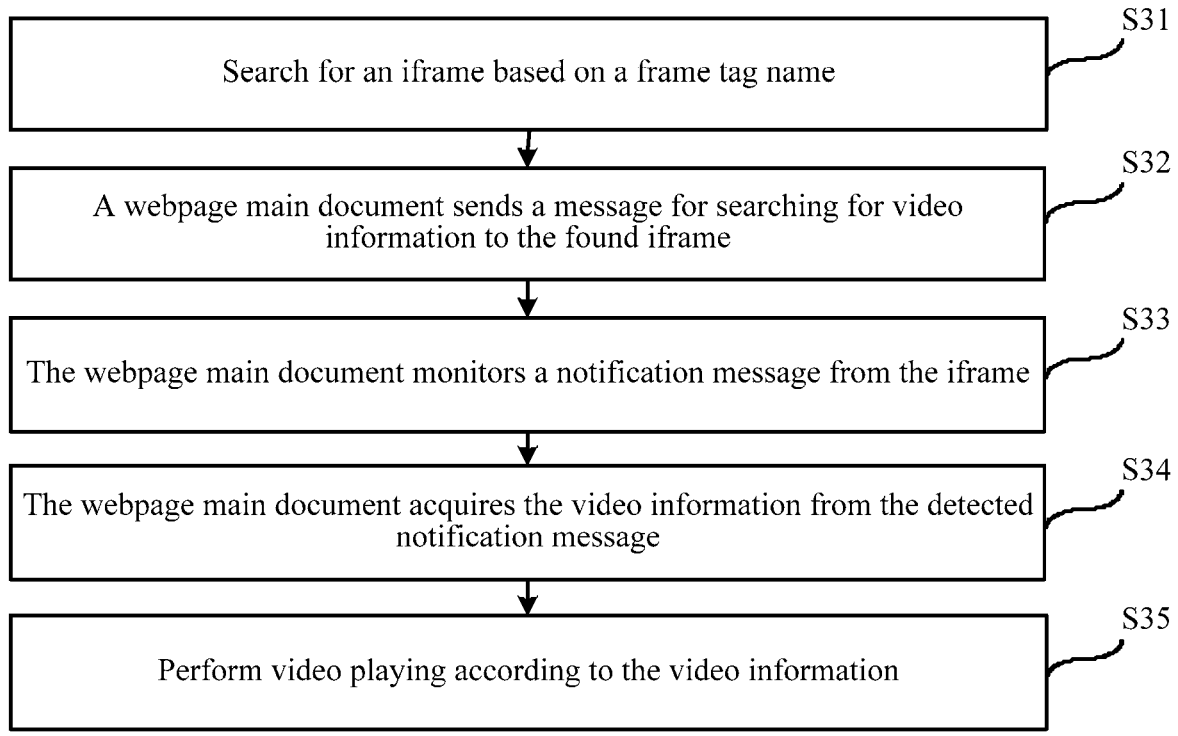
FIG. 3 is a third flowchart of a video playing method according to an embodiment of the present application.

In addition, in a process of webpage loading by the browser of the mobile terminal, a webpage frame file is further needed, to provide a basis to a webpage page layout. The frame file includes a webpage main frame (mainframe) and an iframe. Generally, related information, such as video information, is introduced to a webpage by using a cross-domain iframe. A premise that the webpage main document acquires the video information in the cross-domain iframe is that a cross-domain iframe exists in the webpage. Therefore, a cross-domain iframe in the webpage is first searched in the method of the embodiments of the present application. Based on the above, the present application further provides a specific implementation method of a video playing method. The method can also be run on the mobile terminal on which a browser is installed. As shown in FIG. 3, main processing steps of the method include:

Step S31: Search for an iframe based on a frame tag name.

In a frame file of a webpage loaded in the browser of the mobile terminal, there is a frame tag list. A webpage main document traverses the frame tag list and compares the frame tag name in the frame tag list with "iframe" one by one. When the compared frame tag name is consistent with "iframe", it indicates that an iframe exists in the frame file of the webpage.

Step S32: A webpage main document sends a message for searching for video information to the found iframe.

In a process of searching for the video information, the webpage main document first searches whether video information exists in the webpage main frame. If video information exists in the webpage main frame, the video information in the webpage main frame is acquired. If video information does not exist in the webpage main frame, the webpage main document sends the message for searching for video information to the found iframe.

The iframe has a monitoring instruction used to monitor the webpage main document. After the webpage main document sends the message for searching for video information to the iframe, the iframe searches for a video marker included in the iframe in response to the message, and acquires the video information based on the found video marker.

The monitoring instruction in the iframe is injected by a network module of the mobile terminal to the iframe before webpage rendering.

The monitoring instruction in the iframe is an instruction formed based on JS, and the instruction formed base on JS can perform cross-domain access.

After finding the video information, the iframe sends a notification message to the webpage main document. The iframe notifies the webpage main document of the acquired video information by using a JS instruction in a manner of asynchronous communication.

Step S33: The webpage main document monitors a notification message from the iframe.

An interaction instruction used to interact with the iframe is set in the webpage main document. The interaction instruction can monitor the notification message sent by the iframe, and the interaction instruction is an instruction formed based on JS.

When the iframe sends a notification message of finding the video information to the webpage main document, the interaction instruction in the webpage main document monitors and responds to the notification message.

Step S34: The webpage main document acquires the video information from the detected notification message.

The webpage main document monitors the notification message from the iframe and regularly searches for and acquires the video information.

Step S35: Perform video playing according to the video information.

In specific implementations, the video information acquired by the cross-domain iframe may be a video address. In specific implementations, video playing may be performed according to the video address by calling a player built in the browser.

By means of the video playing method of the present application, a cross-domain video can be played by calling a player built in the browser on the browser of the mobile terminal, improving user experience of a service of playing a cross-domain video.

Figure 4:
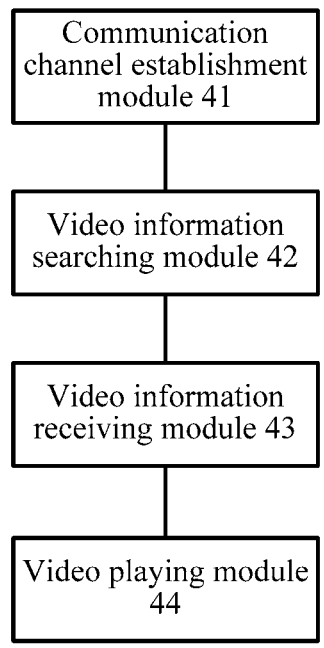
FIG. 4 is a schematic structural diagram of a video playing apparatus according to an embodiment of the present application.

Corresponding to the foregoing video playing method, an embodiment of the present application further provides a video playing apparatus. Referring to a block structural diagram of a video playing apparatus according to an embodiment of the present application shown in FIG. 4, the apparatus includes the following modules:

a communication channel establishment module 41, configured to establish a video message communication channel between a webpage main document including an iframe and the iframe;

a video information searching module 42, configured to enable the iframe to search for a video marker included in the iframe and acquire video information according to the video marker;

a video information receiving module 43, configured to enable the webpage main document to receive the video information returned by the iframe by using the communication channel; and a video playing module 44, configured to perform video playing according to the video information.

In the foregoing apparatus of the present application, after the webpage main document and the iframe establish a connection based on a message communication channel, the iframe can search for a video marker included in the iframe, acquire video information according to the found video marker, and send the acquired video information to a webpage main document, so as to call a player built in a current browser to perform playing when playing a video, thereby improving user experience in a service of playing a cross-domain video.

There are multiple manners for triggering the iframe to search for the video marker included in the iframe, such as when the iframe includes video information, automatic triggering or triggering by the webpage main document.

Figure 5:
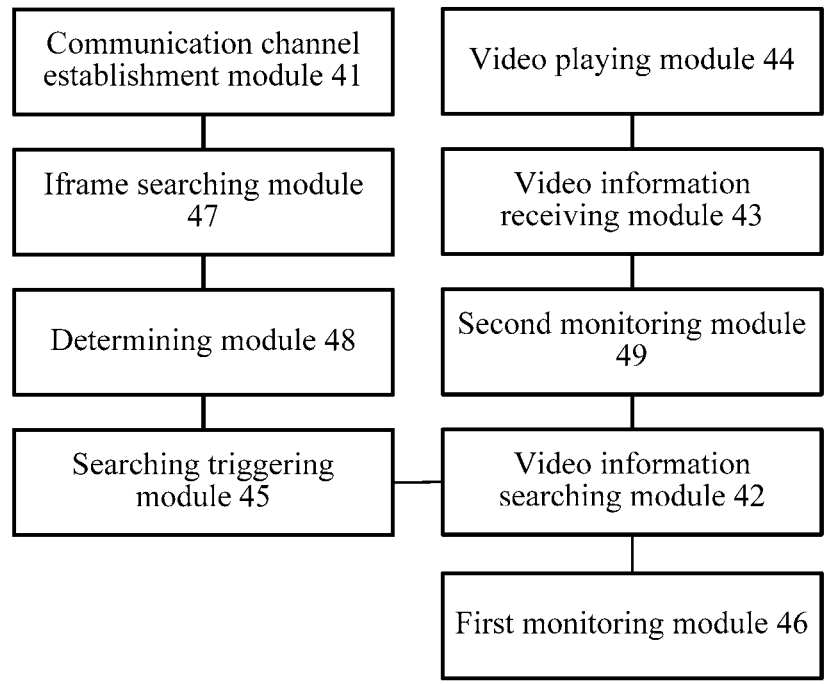
FIG. 5 is a schematic structural diagram of another video playing apparatus according to an embodiment of the present application.

Refer to a block structural diagram of another video playing apparatus according to an embodiment of the present application shown in FIG. 5.

When an action of searching, by the iframe, for the video marker included in the iframe is triggered by the webpage main document, to implement the trigger action, the structure of the video playing apparatus further includes a searching triggering module 45, configured to enable the webpage main document to send a message for searching for the video information to the iframe by using the communication channel. In this case, the video information searching module in the video playing apparatus is configured to enable the iframe to search for a video marker included in the iframe in response to the message and acquire the video information according to the video marker.

After the webpage main document sends the message for searching for the video information to the iframe, to enable the iframe to know and respond to the message in time, a monitoring instruction may be set in the iframe to monitor the webpage main document.

To implement monitoring, by the iframe, the webpage main document, the video playing apparatus may further include a first monitoring module 46, configured to add the monitoring instruction formed based on JS to the iframe for the iframe to monitor the message from the webpage main document and for searching for the video information.

When loading a webpage, the browser of the mobile terminal needs a frame file. The frame file includes a webpage main frame (mainframe) and a cross-domain iframe. Generally, a file, such as a video, is introduced into the webpage by using the cross-domain iframe. Therefore, to acquire the video information in the cross-domain iframe, the webpage main document first needs to search for the cross-domain iframe in the webpage.

Considering that a frame tag list exists in the frame file, when the cross-domain iframe in the frame file is searched, the frame tag list in the frame file may be used, and a frame tag name in the frame tag list is used to search for the cross-domain iframe in the frame file. Based on the above, the foregoing video playing apparatus further includes an iframe searching module 47 and a determining module 48. The iframe searching module is configured to search for an iframe included in the webpage main document based on the frame tag name. The determining module is configured to determine whether video information exists in the webpage main frame of the webpage main document. The foregoing searching triggering module in the apparatus is configured to send a message for searching for the video information to the found webpage iframe when the video information does not exist in the webpage main frame.

By means of the foregoing manner, the cross-domain iframe in the frame file can be found in a relatively simple manner, and the message for searching for the video information is sent to the iframe.

A monitoring instruction used to monitor the webpage main document is set in the cross-domain iframe. After the webpage main document sends the message for searching for the video information to the iframe, the iframe searches for a video marker included in the iframe in response to the message, and acquires the video information, such as acquiring a video address, according to the found video marker.

After finding the video information, the iframe sends a notification message to the webpage main document. The iframe notifies the webpage main document of the acquired video information by using a JS instruction in a manner of asynchronous communication.

An interaction instruction used to interact with the iframe is set in the webpage main document. The interaction instruction can monitor the notification message sent by the iframe, and the interaction instruction is an instruction formed based on JS. Therefore, in an optional embodiment, the video information receiving module is configured to enable the webpage main document to monitor a notification message from the webpage iframe, and acquire the video information from the detected notification message.

When the iframe sends a notification message of finding the video information to the webpage main document, the interaction instruction in the webpage main document monitors and responds to the notification message. In another optional embodiment, to implement a message that the webpage main document notifies the iframe, a second monitoring module 49 may be set in the video playing apparatus and is configured to enable the webpage main document to monitor the notification message from the iframe and acquire the video information from the detected notification message.

After acquiring the video information from the detected notification message, the webpage main document calls a player built in a current browser to perform video playing.

In summary, by means of the technical solutions of the present application, a cross-domain video can be played by calling a player built in the browser on the browser of the mobile terminal, improving user experience of a service of playing a cross-domain video.

The implementation principles and produced technical effects of the apparatuses and modules provided in the embodiments of the present application are the same as those in the foregoing method. For brief description, refer to corresponding content in the foregoing method embodiment for parts not mentioned in this embodiment.

A computer program product for playing a cross-domain video provided in an embodiment of the present application includes a computer readable storage medium storing program code. The program code includes instructions for executing the method in the foregoing method embodiment. Specific implementations are described in the method embodiments. Details are not repeated herein.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

The flowcharts and block diagrams in the figures illustrate the architecture, functions, and operation of possible implementations of systems, methods and computer program products according to various embodiments of the present application. In this regard, each block in the flowcharts or block diagrams may represent a module, segment, or portion of code, which includes one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functions involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

When the foregoing functions are implemented in the form of a software functional unit and sold or used as an independent product, the functions may be stored in a computer readable storage medium. Based on such an understanding, the technical solutions of the present application essentially, or the part contributing to the prior art, or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 6:
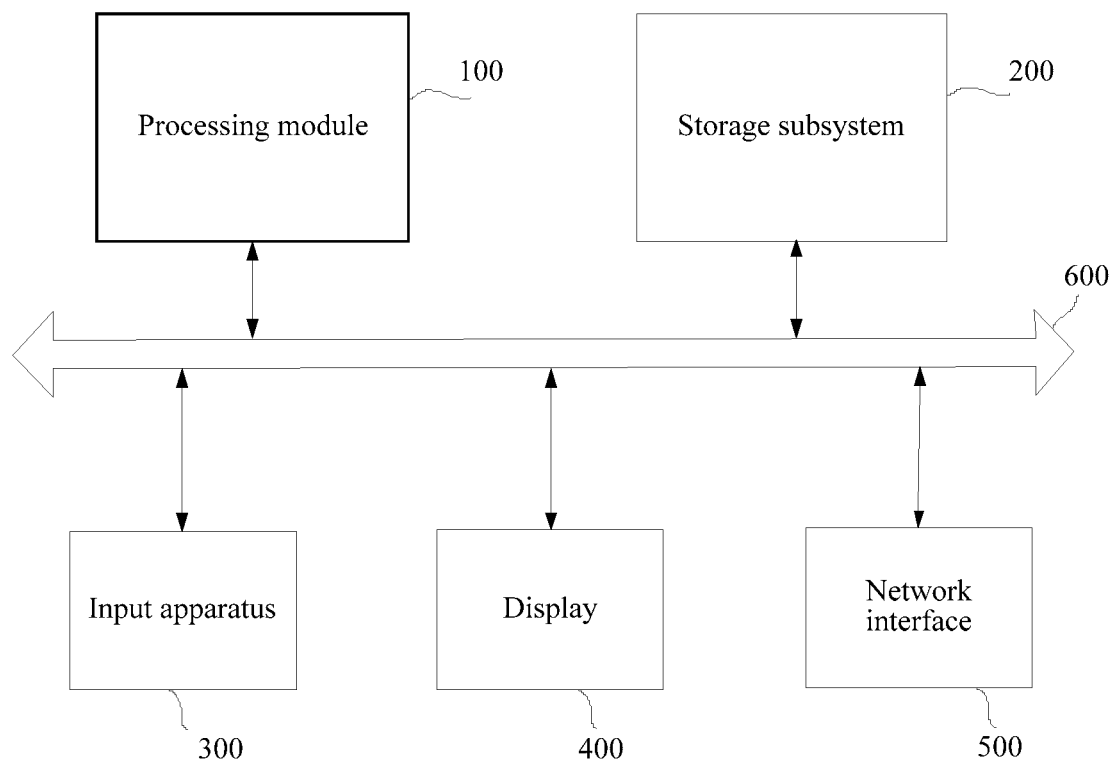
FIG. 6 is a block structural diagram of a computing device according to an implementation manner of the present invention.

FIG. 6 shows a block structural diagram of a computing device provided according to an implementation manner of the present invention. The computing device may be implemented as computer apparatuses of various types, such as a desktop computer, a portable computer, a tablet computer, a smartphone, a personal data assistant (PDA), an intelligent wearable device, or a computer apparatus of another type, but is not limited to any particular form. A computer may include a processing module 100, a storage subsystem 200, an input apparatus 300, a display 400, a network interface 500, and a bus 600.

The processing module 100 may be a multi-core processor and may also include multiple processors. In some embodiments, the processing module 100 may include a universal main processor and one or more special assistant processors, such as a graphic processing unit (GPU) and a digital signal processor (DSP). In some embodiments, the processor 100 may use customized circuit implementation, such as an application specific integrated circuit (application specific integrated circuit, ASIC) or field programmable gate arrays (field programmable gate arrays, FPGA). In some implementation manners, the processing module 100 may be a similar circuit executing an executable instruction stored thereon. In some other implementation manners, the processing module 100 may execute executable instructions stored on a storage subsystem 200.

The storage subsystem 200 may include storage units of various types, such as a system memory, a read-only memory (ROM), and a permanent storage apparatus. The ROM may store static data or an instruction needed by the processing module 100 or other modules of the computer. The permanent storage apparatus may be a readable-writable storage apparatus. The permanent storage apparatus may be a nonvolatile storage device that does not lose stored instructions and data even after the computer powers off. In some implementation manners, the permanent storage apparatus uses a large-capacity storage apparatus (such as a magnetic disk or an optic disc, or a flash memory). In some other implementation manners, the permanent storage apparatus may be a movable storage device (such as a floppy disk and a CD driver). A system memory may be a readable-writable storage device or a nonvolatile readable-writable storage device, such as a dynamic random access memory. The system memory may store some or all of instructions and data needed when the processor is running. In addition, the storage subsystem 200 may include a random combination of computer readable storage media and includes semiconductor storage chips (a DRAM, an SRAM, an SDRAM, a flash memory, and a programmable read-only memory of various types, or a magnetic disk and/or an optic disc. In some implementation manners, the storage subsystem 200 may include a readable and/or readable removable storage device, such as a laser disc (CD), a read-only digital multifunctional optic disc (such as a DVD-ROM and a two-layer DVD-ROM), a read-only blue-ray disc, an ultra-density optic disc, a flash memory card (such as an SD card, a min SD card, and a Micro-SD card), and a magnetic floppy disk. The computer readable storage medium does not include a carrier and an instantaneous electronic signal transmitted in a wireless or wired manner. In some implementation manners, the storage subsystem 200 can store one or more software programs that can be executed by the processing module 100 or resource files needed to be called. The resource files may include some third-party libraries, and include, but are not limited to, an audio library, a video library, a 2D graphic library, and a 3D graphic library.

A user interface may be provided by one or more user input apparatus 300, display 400, and/or one or more other user output devices. The input apparatus 300 may include an apparatus of inputting, by a user, signals to a computer. The computer may explain that these signals include a particular user request or information. In some implementation manners, a website may be input to a user interface by using a keyboard, and webpage content corresponding to the input website is displayed. In some implementation manners, the input apparatus 300 may include some or all of keyboard buttons, a touch screen, a mouse or another pointing device, a trolley, a click wheel, a turntable, keys, switches, micro keyboard, and a microphone.

The display 400 can display images generated by the computer and may include image devices of various types, such as a cathode ray tube (CRT), a liquid crystal display (LCD), a light emitting diode (LED) (including an organic light emitting diode (OLED)), a projection system, and the like, and another assembly supporting an electronic apparatus (such as a DAC, an ADC, and a signal processor). In some implementation manners, other user output devices may be additionally provided, or the display 400 is replaced, such as a signal lamp, a speaker, a touch sensor, and a printer.

In some implementation manners, a user interface may be provided by using a graphic user interface. Some visible graphic elements are defined in some areas of the display 400 as interaction objects or control objects selected by a user by using the input apparatus 300. For example, the user may operate the user input apparatus 300 to move a specified position on the screen to input a website and controls displaying webpage content corresponding to the website on the display 400. In some implementation manners, a touch device of user gestures may be identified as an input device, and these gestures may be, but not necessarily, associated with an array on the display 300.

A network interface 500 provides a sound and/or data communication function to the computer. In some embodiments, the network interface 500 may include a radio frequency transceiver to transfer sounds and/or data (for example, using a cellular phone technology, such as a 3G, 4G, or EDGE, WiFi data network technology), a GPS receiving module, and/or another module. In some embodiments, the network interface 500 may provide an extra wireless network to connect to or replace a wireless interface. The network interface 500 may be a combination of hardware (such as an antenna, a modem, a coder, and other analog and/or digital signal processing circuits) and software modules.

The bus 600 may include various systems, external devices, and chip buses that connect parts within the computer. For example, the bus 600 connects the processing module 100 and the storage subsystem 200, and can also connect the input apparatus 300 and the display 400. The bus 600 can also make the computer be connected to a network by using the network interface 500. In this case, the computer may be used as a part of multiple networking computer devices. Any or all parts of the computer can all be used in coordination in the implementation manners of the present invention.

Some implementation manners include an electronic element, such as a micro-processor and a memory that stores computer instructions and data in the computer readable storage medium. Many features described in the specific implementation manners can all be implemented by using method steps of executing computer instructions stored on the computer readable storage medium. When these computer instructions are executed, the processing unit of the computer completes various functions of the instructions. A program instruction or an implementation manner of computer coding may be machine code, such as code obtained by using a computer, an electronic element, or a microprocessor of a to-be-parsed machine to compile another advanced languages.

It will be appreciated that the computer is implicit. The computer may have other functions that are not specifically described (such as mobile communication, GPS, power source management, one or more cameras, and various connection ports or accessories for connecting to an external device). Further, particular functional modules involved in the computer 100 are described herein. Descriptions for these functional modules are to facilitate description and do not mean particular physical configurations for functional parts. In addition, these functional modules do not need to correspond to physical modules one to one. Modules can be configured to complete various operations. For example, modules may also be reconfigured according to initial settings by programming or setting a proper control circuit. The embodiments of the present invention can be implemented in various devices, such as an electronic device, by combining hardware and hardware.

The embodiment further provides a nonvolatile readable storage medium. The storage medium stores one or more modules (programs). When the one or more modules is applied to a computing device, the computing device may be made to execute instructions (instructions) of the following steps:

establishing a video message communication channel between a webpage main document including a webpage iframe and the webpage iframe; searching, by the webpage iframe, for a video marker included in the webpage iframe and acquiring video information according to the video marker; and receiving, by the webpage main document, the video information returned by the webpage iframe by using the communication channel, and performing video playing according to the video information.

Optionally, the steps further include: sending, by the webpage main document, a message for searching for the video information to the webpage iframe by using the communication channel; and searching, by the webpage iframe, for the video marker included in the webpage iframe in response to the message, and acquiring the video information according to the video marker.

adding a monitoring instruction formed based on JavaScript into the webpage iframe for the webpage iframe to monitor the message from the webpage main document and for searching for the video information.

Optionally, the steps further include: searching for the webpage iframe included in the webpage main document based on a frame tag name; and determining whether the video information exists in a webpage main frame of the webpage main document, and sending the message for searching for the video information to the found webpage iframe if the video information does not exist in the webpage main frame of the webpage main document.

Optionally, the steps further include: monitoring, by the webpage main document, a notification message from the webpage iframe; and acquiring the video information from the detected notification message.

Optionally, the receiving, by the webpage main document, the video information returned by the webpage iframe by using the communication channel includes: monitoring, by the webpage main document, a notification message from the webpage iframe; and acquiring the video information from the detected notification message.

Optionally, the performing video playing according to the video information includes: calling a player built in a current browser to perform video playing according to the video information.

Optionally, the message for searching for the video information is a message formed based on JavaScript.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application should be subject to the protection scope of the claims.

What is claimed is:

1. A video playing method, comprising:
establishing a video message communication channel between a webpage main document comprising a webpage iframe and the webpage iframe;
searching, by the webpage iframe, for a video marker comprised in the webpage iframe and acquiring video information according to the video marker; and
receiving, by the webpage main document, the video information returned by the webpage iframe by using the communication channel, and performing video playing according to the video information.

2. The method according to claim 1, further comprising:
sending, by the webpage main document, a message for searching for the video information to the webpage iframe by using the communication channel, wherein
the searching, by the webpage iframe, for a video marker comprised in the webpage iframe and acquiring video information according to the video marker comprises:
searching, by the webpage iframe, for the video marker comprised in the webpage iframe in response to the message, and acquiring the video information according to the video marker.

3. The method according to claim 2, further comprising:
adding a monitoring instruction formed based on JavaScript into the webpage iframe for the webpage iframe to monitor the message from the webpage main document and for searching for the video information.

4. The method according to claim 2, before the sending, by the webpage main document, a message for searching for the video information to the webpage iframe by using the communication channel, further comprising:
searching for the webpage iframe comprised in the webpage main document based on a frame tag name; and
determining whether the video information exists in a webpage main frame of the webpage main document, and executing a step of sending the message for searching for the video information to the found webpage iframe if the video information does not exist in the webpage main frame of the webpage main document.

5. The method according to claim 2, wherein the message for searching for the video information is a message formed based on JavaScript.

6. The method according to claim 1, further comprising:
monitoring, by the webpage main document, a notification message from the webpage iframe; and
acquiring the video information from the detected notification message.

7. The method according to claim 1, wherein the receiving, by the webpage main document, the video information returned by the webpage iframe by using the communication channel comprises:
monitoring, by the webpage main document, a notification message from the webpage iframe; and
acquiring the video information from the detected notification message.

8. The method according to claim 1, wherein the performing video playing according to the video information comprises:

calling a player built in a current browser to perform video playing according to the video information.

9. A computer readable storage medium comprising a program for executing the method according to claim 1.

10. A video playing apparatus, comprising a non-transitory computer readable medium having executable instructions stored thereon, that when executed by a processor, performs operations of:

establishing a video message communication channel between a webpage main document comprising a webpage iframe and the webpage iframe;

enabling the webpage iframe to search for a video marker comprised in the webpage iframe and acquire video information according to the video marker;

enabling the webpage main document to receive the video information returned by the webpage iframe by using the communication channel; and performing video playing according to the video information.

11. The apparatus according to claim 10, wherein the instructions, when executed by the processor, further perform operations of:

enabling the webpage main document to send a message for searching for the video information to the webpage iframe by using the communication channel;

enabling the webpage iframe to search for the video marker comprised in the webpage iframe in response to the message, and acquiring the video information according to the video marker.

12. The apparatus according to claim 11, wherein the instructions, when executed by the processor, further perform operations of:

adding a monitoring instruction formed based on JavaScript into the webpage iframe for the webpage iframe to monitor the message from the webpage main document and for searching for the video information.

13. The apparatus according to claim 11, wherein the instructions, when executed by the processor, further perform operations of:

searching for the webpage iframe comprised in the webpage main document based on a frame tag name;

determining whether the video information exists in a webpage main frame of the webpage main document; and sending the message for searching for the video information to the found webpage iframe if the video information does not exist in the webpage main frame of the webpage main document.

14. The apparatus according to claim 10, wherein the instructions, when executed by the processor, further perform operations of:

enabling the webpage main document to monitor a notification message from the webpage iframe, and acquiring the video information from the detected notification message.

15. A computing device, comprising:

one or more processors;

a memory; and one or more modules, stored in the memory and configured to be executed by the one or more processors, wherein the one or more modules are configured to:

establish a video message communication channel between a webpage main document comprising a webpage iframe and the webpage iframe;

search, by the webpage iframe, for a video marker comprised in the webpage iframe and acquire video information according to the video marker; and receive, by the webpage main document, the video information returned by the webpage iframe by using the communication channel, and perform video playing according to the video information.

\* \* \* \* \*